US010676277B2

(12) United States Patent
Cioclei et al.

(10) Patent No.: US 10,676,277 B2
(45) Date of Patent: Jun. 9, 2020

(54) MODULAR SYSTEM AND METHOD FOR MATERIAL STORAGE AND CONVEYING

(71) Applicant: Amada America, Inc., Buena Park, CA (US)

(72) Inventors: Mihai Cioclei, Chino Hills, CA (US); Michael Beransky, Irvine, CA (US); Karapet Kirishchyan, Chino, CA (US); David Alvin Alfrey, Rancho Cucamonga, CA (US)

(73) Assignee: Amada America, Inc., Buena Park, CA (US)

( * ) Notice: Subject to any disclaimer, the term of this patent is extended or adjusted under 35 U.S.C. 154(b) by 0 days.

(21) Appl. No.: 16/667,126

(22) Filed: Oct. 29, 2019

(65) Prior Publication Data

US 2020/0062500 A1 Feb. 27, 2020

Related U.S. Application Data

(63) Continuation of application No. 16/041,692, filed on Jul. 20, 2018, now Pat. No. 10,494,177.

(51) Int. Cl.
*B65G 1/06* (2006.01)
*B65G 1/10* (2006.01)
*B65G 1/02* (2006.01)

(52) U.S. Cl.
CPC ............ *B65G 1/023* (2013.01); *B65G 1/06* (2013.01); *B65G 1/10* (2013.01); *B65G 2207/30* (2013.01)

(58) Field of Classification Search
CPC ............ B65G 1/06; B65G 1/10; B65G 1/023

USPC ..... 198/407, 575, 576, 586, 604, 605, 861.1
See application file for complete search history.

(56) References Cited

U.S. PATENT DOCUMENTS

| | | |
|---|---|---|
| 4,014,428 A | 3/1977 | Ossbahr |
| 4,615,429 A | 10/1986 | Arase et al. |
| 4,684,314 A | 8/1987 | Luth |
| 4,701,097 A | 10/1987 | Sturtz |
| 4,829,748 A | 5/1989 | Uehira et al. |
| 4,946,340 A | 8/1990 | Murphy |
| 4,979,870 A | 12/1990 | Mojden |
| 5,193,970 A | 3/1993 | Chiappe et al. |
| 5,379,229 A | 1/1995 | Parsons |
| 5,564,264 A | 10/1996 | DeCrane |
| 5,979,606 A | 11/1999 | Wheeler |
| 6,336,549 B1 | 1/2002 | Wheeler |
| 6,394,257 B1 | 5/2002 | Wheeler |
| 6,976,573 B2 | 12/2005 | Brixius |
| 7,255,226 B2 | 8/2007 | Lawless et al. |
| 7,452,178 B2 | 11/2008 | Dall'omo |
| 7,584,834 B2 | 9/2009 | Wood |
| 7,673,743 B2 | 3/2010 | Ruff |
| 7,699,158 B2 | 4/2010 | Aust |
| 7,871,232 B2 | 1/2011 | Lutz |
| 9,022,204 B2 | 5/2015 | Wang |
| 9,382,025 B2 | 7/2016 | De Vries |
| 9,688,479 B1 | 6/2017 | Gorski |

(Continued)

*Primary Examiner* — Douglas A Hess
(74) *Attorney, Agent, or Firm* — Cionca IP Law P.C.; Marin Cionca

(57) ABSTRACT

A modular system for material storage and conveying having a layered storage section with two or more storage layers having conveyors, the layered storage section being associated with a load section and a delivery section having their own conveyors at each end of the layered storage section, and elevators that can selectively position the load and delivery section at operational heights of the conveyors of the layered storage section.

9 Claims, 15 Drawing Sheets

(56) References Cited

U.S. PATENT DOCUMENTS

2009/0277753 A1 11/2009 Violle
2013/0169304 A1 7/2013 Nakajima

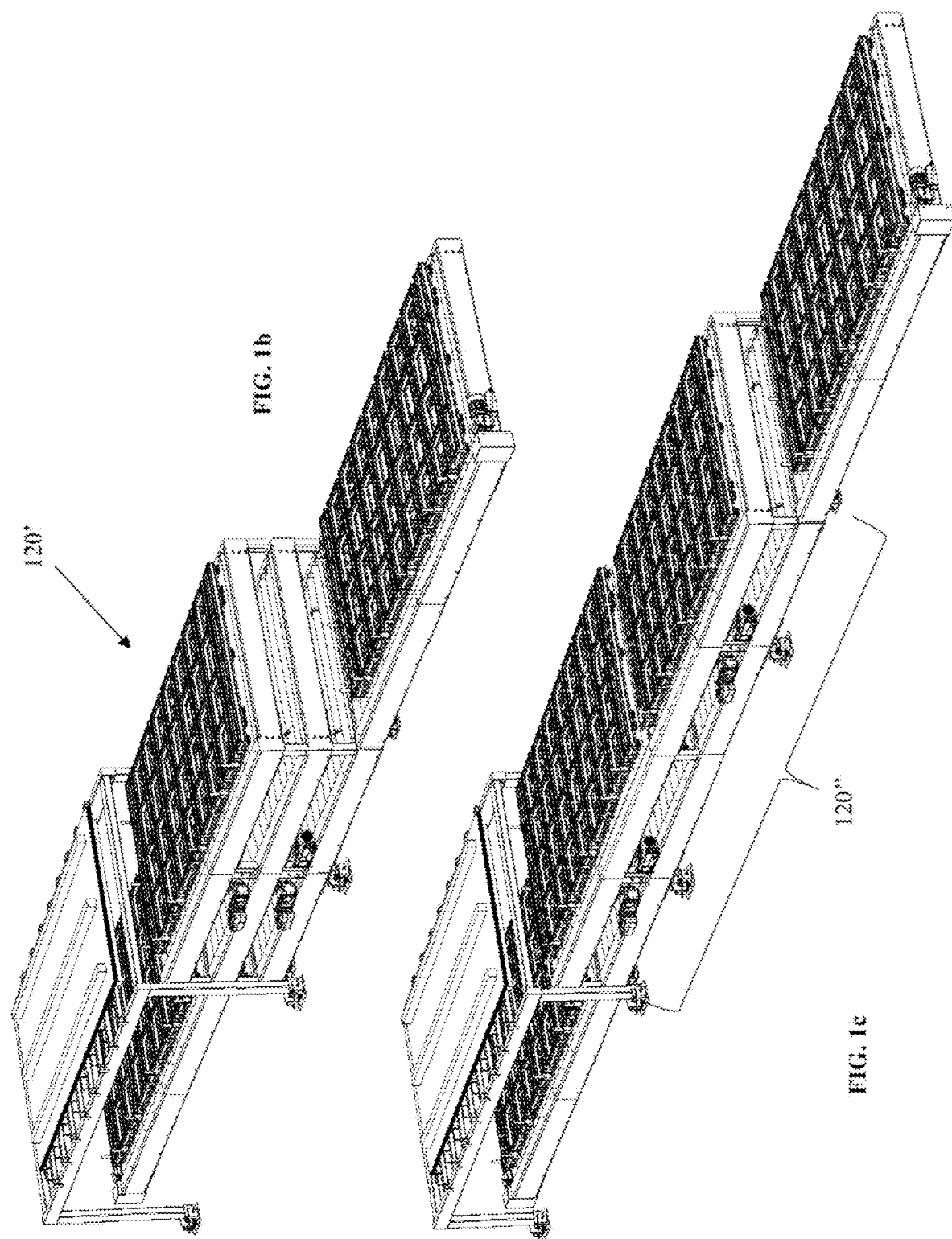

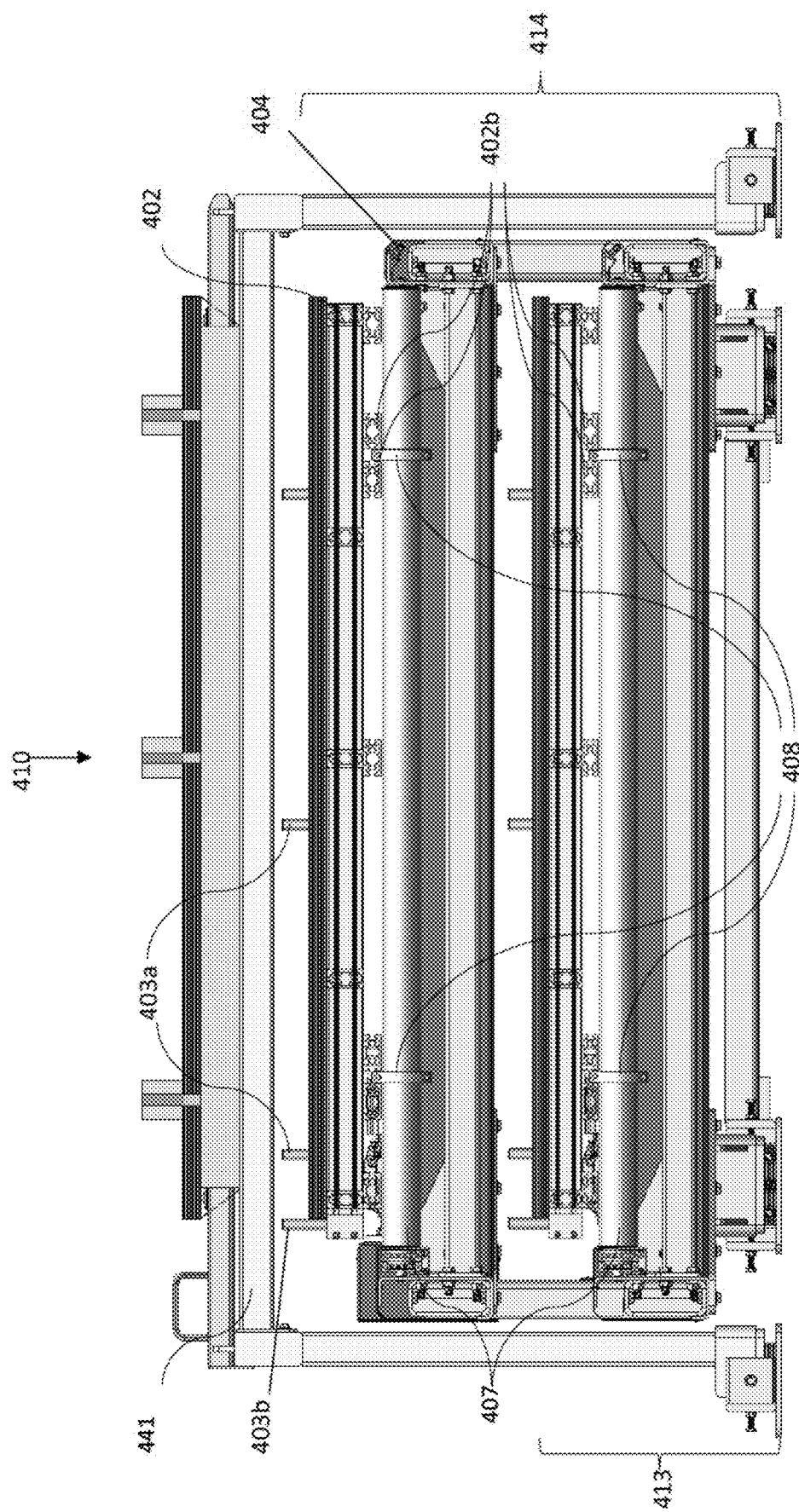

MODULAR SYSTEM AND METHOD FOR MATERIAL STORAGE AND CONVEYING

CROSS-REFERENCE TO RELATED APPLICATIONS

This application is a continuation and claims the benefit of U.S. Non-Provisional application Ser. No. 16/041,692, filed Jul. 20, 2018, which is hereby incorporated by reference, to the extent that it is not conflicting with the present application.

BACKGROUND OF INVENTION

1. Field of the Invention

The invention relates generally to storage and conveyor systems and methods and more particularly to systems and methods for achieving both horizontal storage and bidirectional reciprocal conveying.

2. Description of the Related Art

Businesses often need to store and move a number of stacked materials for commercial, manufacturing and/or warehousing purposes. Material storage systems are commonly designed to store materials vertically, using shelf-like systems. These vertical storage systems require spaces with high ceiling height to be installed, thus limiting businesses to only choose buildings with sufficient ceiling height or at least buildings that have areas with sufficient ceiling height. Installing storage systems in spaces with high ceilings can also be inefficient if the installation location is a far distance from where the material needs to be used.

Also, vertical material storage systems can often only move one material holding position at a time, which makes exchanging material positions require long cycle times. This limitation could be a very serious problem, leading to great inefficiencies, when for example the storage system needs to also function as a conveyor to supply raw materials or receive processed materials of various categories (e.g., metal sheets of various thicknesses) in a manufacturing context (e.g., in metal laser processing applications).

Thus, there is a need for a new and improved storage and conveying system and method that address and solve the problems outlined above.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, the Modular Conveyor and Storage System (MCSS, the system) disclosed herein provides horizontal rather than vertical storage for raw or processed stack materials, thus eliminating the need for high ceiling clearance and increasing storage capacity of a facility by expanding storage in a horizontal direction. In an aspect, central to the system is a layered storage section. In an embodiment, the layered storage section may have two storage levels providing the upper and lower levels of a reciprocating loop. The MCSS has elevator mounted conveyors at both end sections that can transfer pallets that may be loaded with material to and from each level of the center layered storage section. The conveyors may use frame mounted pipe rollers to achieve a bidirectional reciprocating motion when transferring pallets. Positioning elevator mounted conveyors at both end sections of the MCSS speeds up the pallet exchange cycles by allowing multiple pallets to move simultaneously in a bidirectional reciprocating motion, which speeds access to the next required storage position.

In an example, the MCSS may be designed to supply the required raw materials to a Cycle Loader, which in turn may feed said raw materials to a laser processing machine. The MCSS may accomplish this function by positioning the required material for loading into the laser cutting machine by the Cycle Loader. The system may also be extended or modified to provide storage for processed (e.g., cut) materials unloaded by the Cycle Loader.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which:

FIGS. 1a-c illustrate a perspective view of exemplar embodiments of a Modular Conveyor and Storage System (MCSS the system) and a material load frame, according to an aspect.

FIG. 4 illustrates the side elevation view of the material load/lift section and material load frame, according to an aspect.

DETAILED DESCRIPTION

Figure 1A:
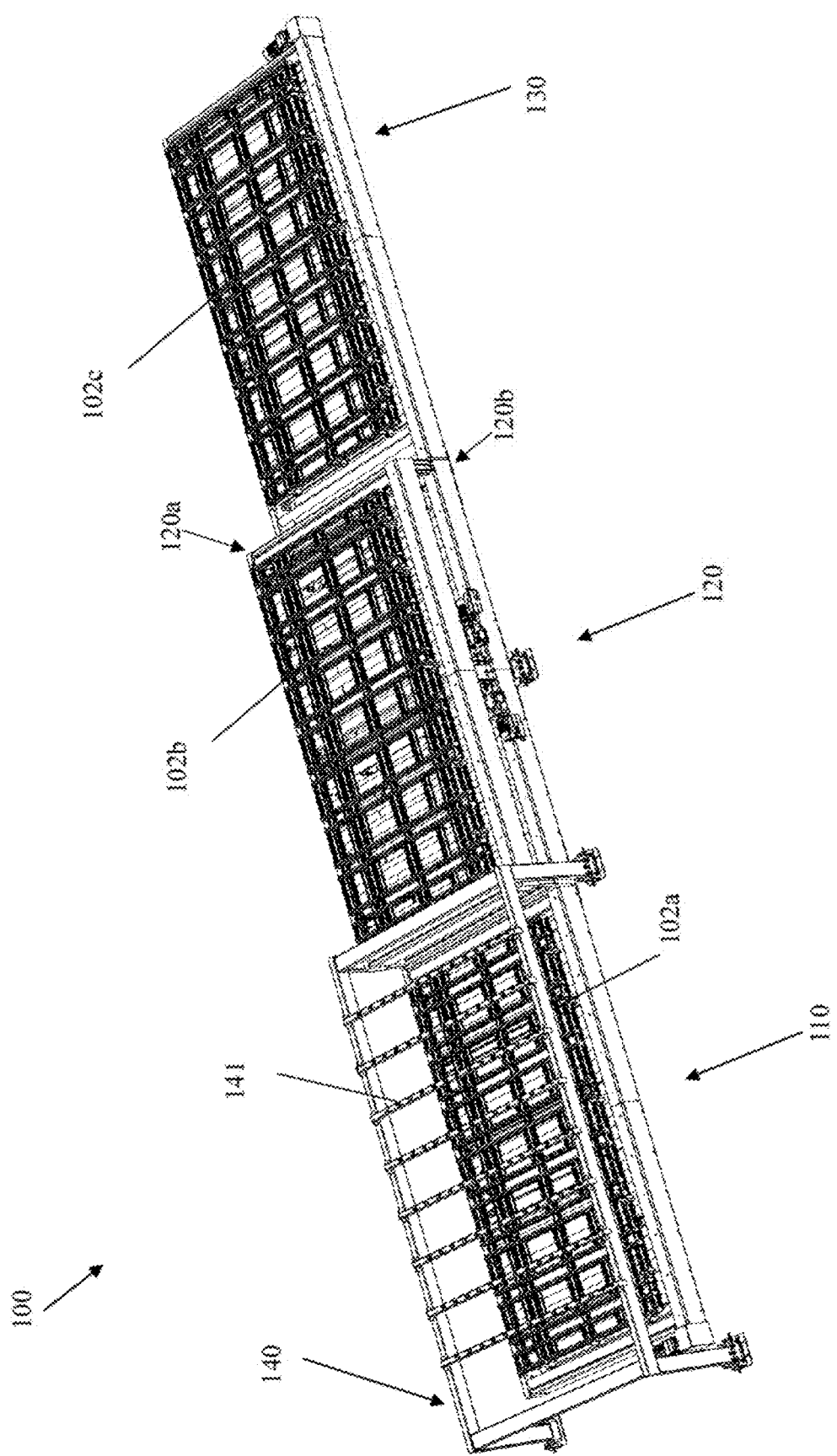

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

Logic as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware.

For the following description, it can be assumed that most correspondingly labeled elements across the figures (e.g., 120 in FIGS. 1 and 220 in FIG. 2, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIGS. 1a-c illustrates a perspective view of exemplary embodiments of a Modular Conveyor and Storage System (MCSS, the system) 100 and a material load frame 140, according to an aspect. As shown in FIG. 1a, the MCSS 100 may have three main sections: the material load/lift section (section 110; material load section; load section) 110, the layered storage section (section 120) 120, and the Cycle Loader load/lift section (CL load/lift section, section 130; delivery section; material delivery section) 130. As an example, shown in FIGS. 1a, 1c, 2, 3a, 4, 8, 10, 11, and 12a-b, the layered storage section 120 has two layers for material storage: the upper layer 120a and the lower layer 120b. The upper layer 120a is aligned with the upper operation height and the lower layer 120b is aligned with the lower operation height, which are described in greater detail hereinafter, when referring to FIG. 4. It should be understood that the number of levels of the layered storage section 120 can be increased, and with corresponding modifications to the rest of the system, the modified MCSS can operate in a similar manner to what is described below. As an example, the MCSS is shown in FIG. 1b with the layered storage section 120' having three levels (i.e., three vertically disposed storage and conveying layers) for material storage and conveying.

In this example, with section 120 having two storage levels, raw material (not shown in FIG. 1) may be loaded onto the MCSS by placing it onto the cross support bars 141 which may rest on the material load frame 140. It should be noted that, as section 110 and section 130 may be similarly constructed, raw material can also be loaded onto section 130 if the material load frame 140 is placed around section 130 rather than section 110. The raw material may then be transferred onto the dedicated material pallet (dedicated pallet, material pallet, pallet) 102a by using the material loading process described in greater detail hereinafter when referring to FIG. 8.

As an example, the system 100 may be designed specifically to supply raw materials, as will be described in more detail herein, to a CL (Cycle Loader) which loads and unloads product for sheet metal laser processing applications. It should be noted that the system may be extended or modified to also receive and store cut materials unloaded from a laser machine via the Cycle Loader or via another method, as described hereinafter. FIG. 1c illustrates an example of the MCSS with the middle layered storage section 120" extended horizontally (i.e., a second middle layered storage section is added as shown). An example of known Cycle Loader is AMS 3015 CL, made by Amada. The Cycle Loader automates the load/unload process while the MCSS extends storage capacity of raw and cut materials for the Cycle Loader. Further, the MCSS can also assist by positioning the required thickness material for loading into the laser cutting machine by the Cycle Loader. An example of known laser cutting machine is LCG 3015 AJ, made by Amada. As known in the art, laser processing can entail cutting shapes from large blank metal sheets. Blank sheets are typically stacked on pallets having an overall size of 1.5×3.0 meters, or 2.0×4.0 meters. Each sheet has typically a range of 0.7 to 25.4 millimeters in thickness.

Figure 2:
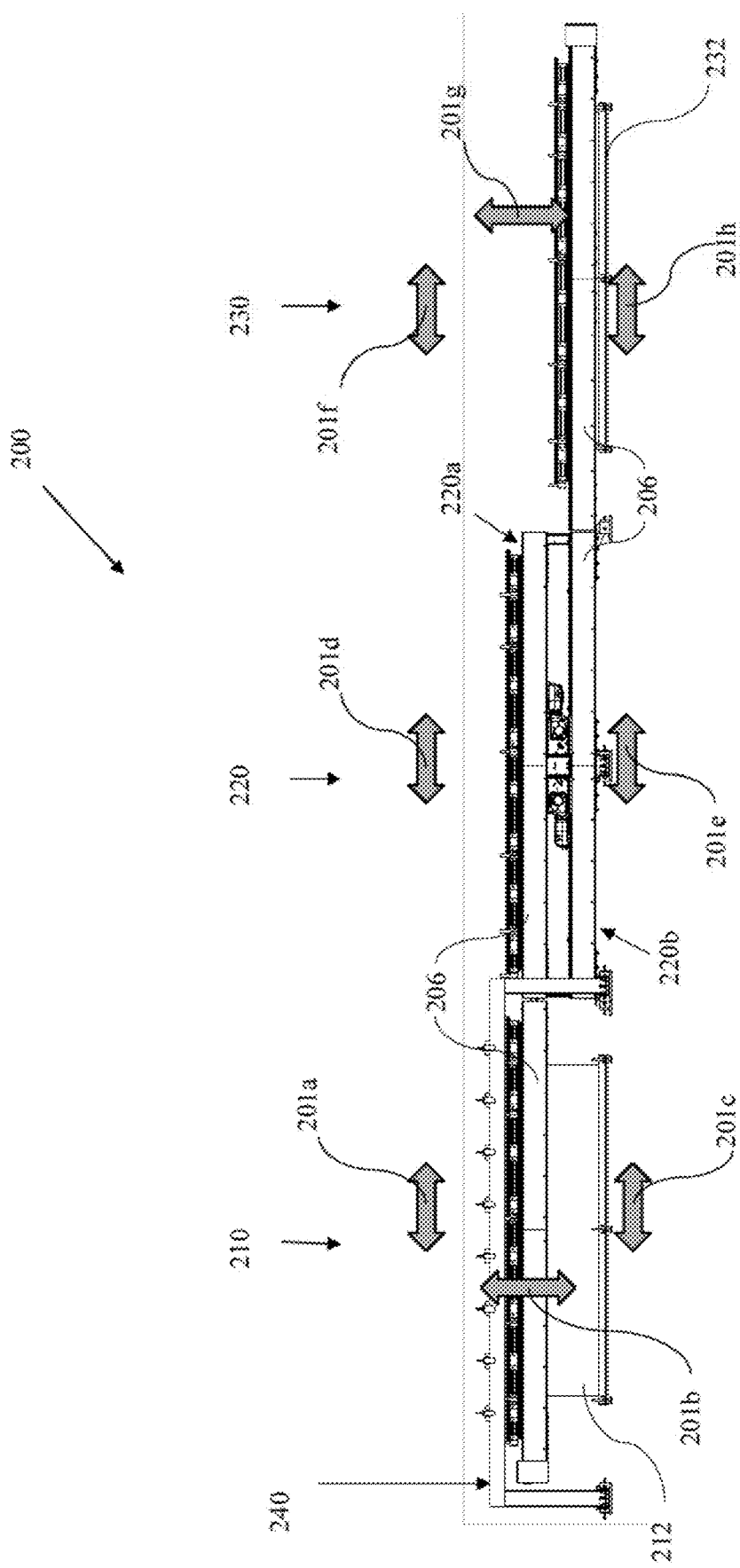
FIG. 2 illustrates the front elevation view of the MCSS and material load frame, according to an aspect.

FIG. 2 illustrates the front elevation view of the MCSS 200 and material load frame (140, 240), according to an aspect. In the example disclosed herein, the MCSS uses a system of conveyors 206 and elevators 212 and 232 to move or exchange material pallets (pallets) 202a-c, which may be loaded with different categories (e.g., different thicknesses) of raw material, between different sections and/or different operation and load heights of the MCSS 200. Every section of the MCSS, section 210, 220 (having layers 220a, 220b) and 230, is equipped with conveyors 206. Conveyors 206 move pallets horizontally between the different sections of the MCSS 200. The material load/lift section 210 and the CL load/lift section 230 are equipped with elevators 212 and 232 that can lift or lower the conveyors of sections 210 and 230. Thus, the elevators 212 and 232 can lift or lower a pallet (with or without material) resting atop a conveyor to different load or operation heights. In the example disclosed herein, the elevators (212 and 232 cannot move pallets horizontally and the conveyors 206 cannot move pallets vertically. It should be noted that, for pallet position exchanges to occur, at least one of the sections 210, 220a, 220b, or 230 must be empty. In other words, there must be no pallet (with or without material) resting atop the conveyor of at least one of sections 210, 220a, 220b, or 230. For example, as shown in FIG. 2, section 220b is empty and no pallet (with or without material) is resting atop its conveyor. The processes that may be used to move or exchange pallets, load materials, and the different operation and load heights are described in greater detail hereinafter when referring to FIGS. 4, 8, 10, and 12a-b.

The direction arrows 201a-g indicate directions in which the load/lift section 210, the layered storage section 220, and the CL load/lift section 220 can move material pallets 202a-c, which may have been loaded with raw material. Arrow 201b indicates that section 210 can move a pallet 202a vertically between different operation and load heights of the MCSS 200. Arrows 201a and 201c indicate that a pallet can be moved horizontally from section 210 to section 220 (or vice versa) at each operation height corresponding with the two layers/levels 220a,b. Similarly, arrow 201g indicates that section 230 can move a pallet 202c vertically between different operation and load heights of the MCSS 200 and arrows 201f and 201h indicate that a pallet 202c can be moved horizontally from section 230 to section 220 (or vice versa) at each operation height corresponding with the two layers/levels 220a,b. Arrow 201d indicates a pallet 202b on the upper storage level 220a can be moved horizontally at that upper level from section 220 to section 210 (or vice versa) or from section 220 to section 230 (or vice versa). Similarly, arrow 210e indicates that a pallet (not shown) on the lower storage level 220b can be moved horizontally at the lower level from section 220 to section 210 (or vice versa) when pallet 202a is lowered by elevator 212, or from section 220 to section 230 (or vice versa).

Figure 3A:
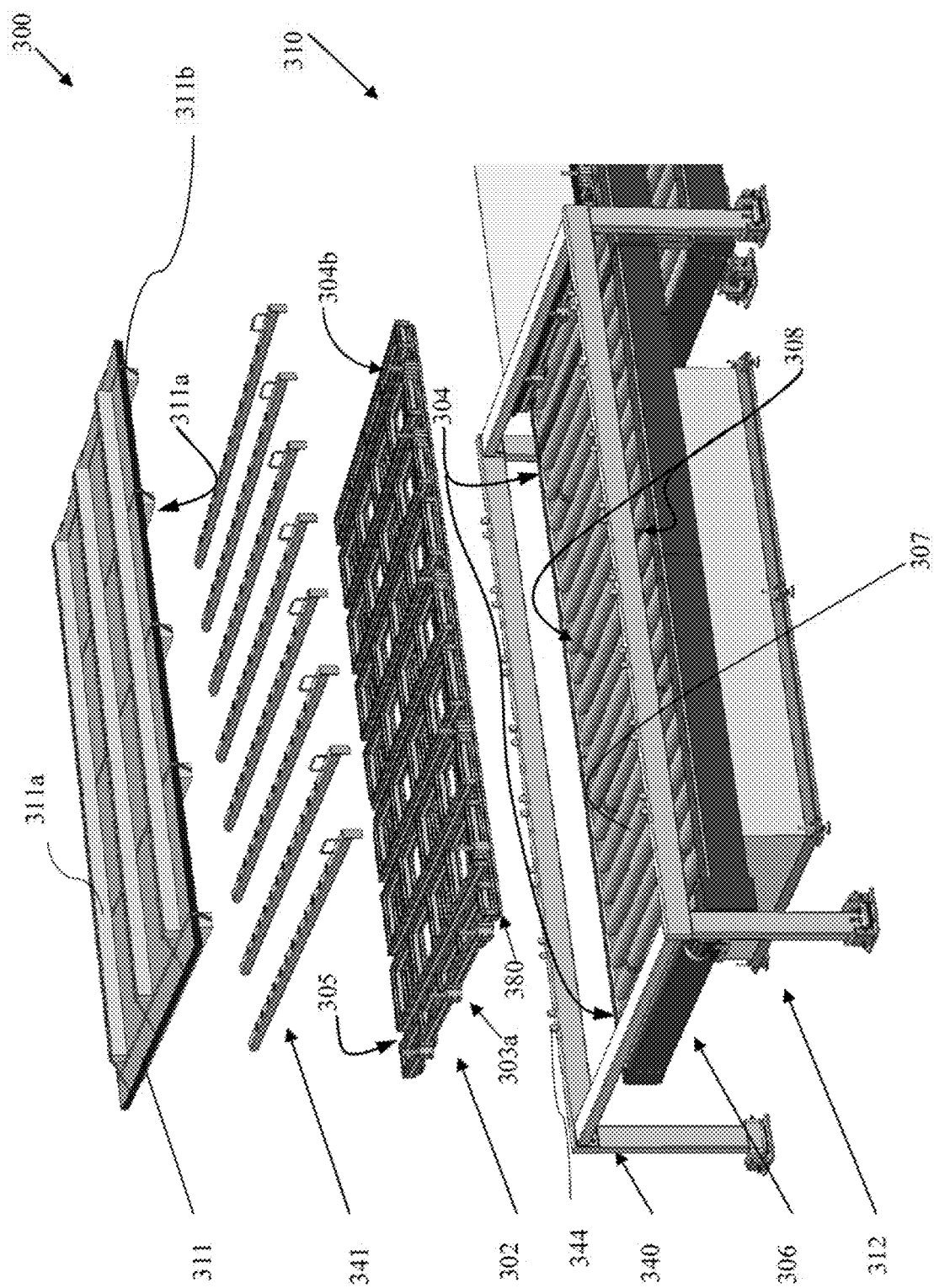
FIGS. 3a-b illustrate an exploded view of the material load lift section of the MCSS and a detailed close-up view of the cross support bars, respectively, according to an aspect.
Figure 3B:
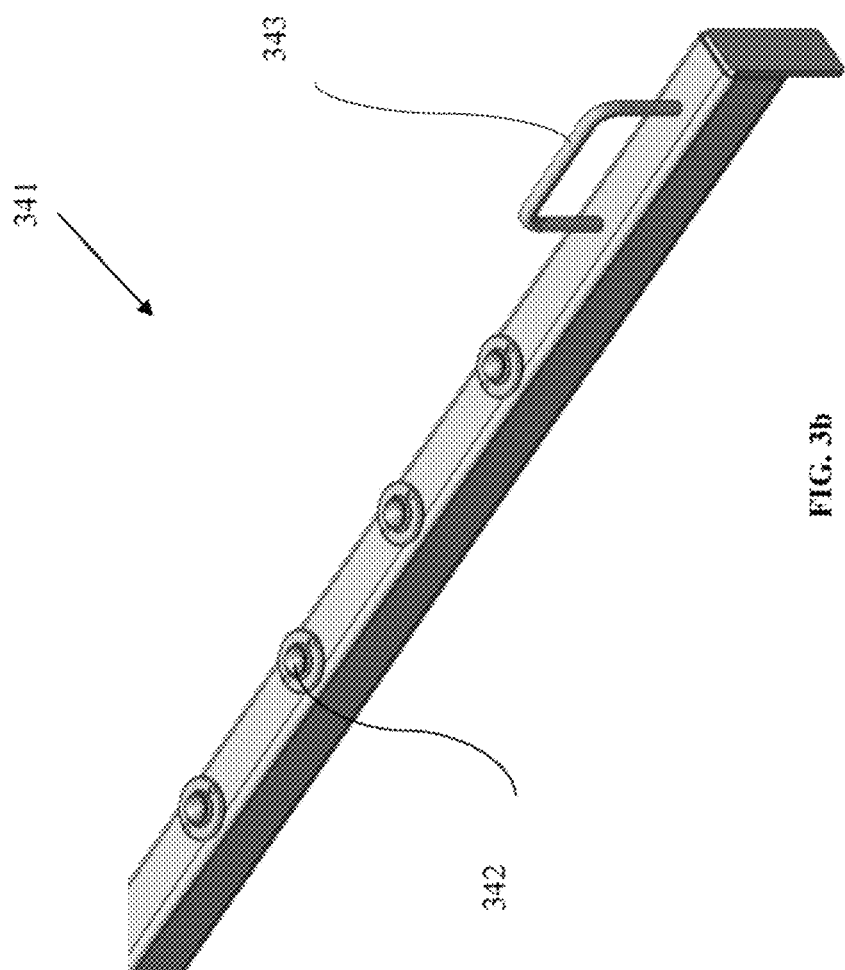

FIGS. 3a-b illustrate an exploded view of the material load lift section 310 of the MCSS 300 and a detailed close-up view of the cross support bars 341, respectively, according to an aspect.

Figure 8:
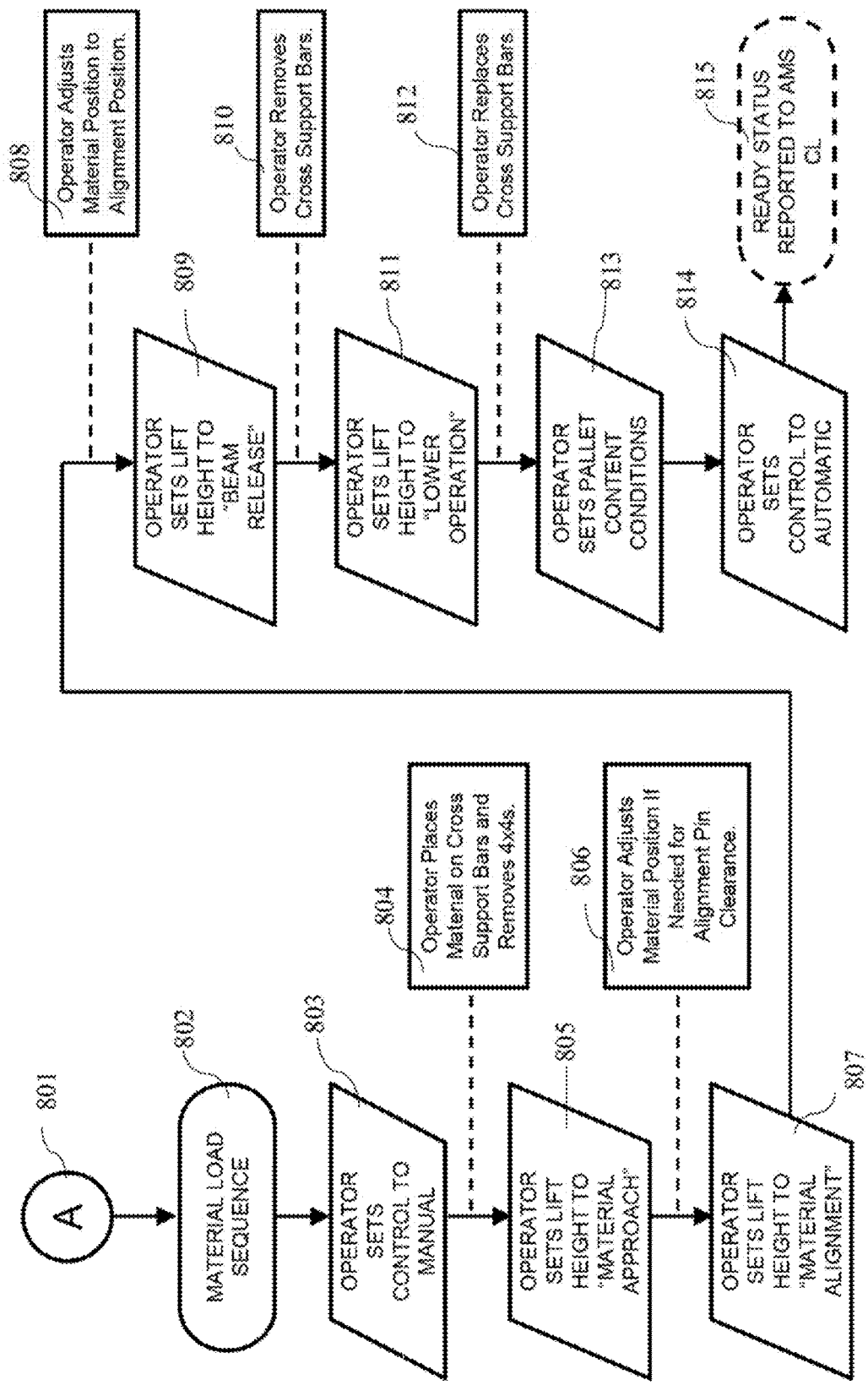
FIG. 8 illustrates a flow chart describing how material may be loaded onto the MCSS.

As shown in FIG. 3a, support lumber 311a may be attached temporarily to the raw material (material) 311 with steel banding 311b to prevent bending of the material during the loading process described in greater detail when referring to FIG. 8. As an example, the raw material 311 may be a 2 meter by 4 meter stack of sheet metal. The support lumber may be 4×4's (4 inch×4 inch) and is preferably attached as shown to the top of the material 311 lengthwise (i.e., across the x-axis of the material) and attached to the bottom of the material 311 widthwise (i.e., across the y-axis of the material). The support lumber 311a may be attached to the bottom of the material 311, as shown, at intervals such that the support lumber 311a will fit in between the cross support bars 341 which rest atop of the material load frame 340. The support bars 341 may be held in place on the load frame 340 by placing the bars between the stabilizing brackets (brackets) 344. A close up view of the cross support bars 341 is shown in FIG. 3b.

During the material loading process described in greater detail when referring to FIG. 8, the free rollers 342 can allow the position of the material to be more easily adjusted by the operator. The support bar handles 343 can allow for the bars 341 to be easily removed during the material loading process as it will explain later in this disclosure. The stabilizing brackets 344 may be positioned on the load frame 340 such that the cross support bars 341 will fit in the pockets 305 of the dedicated pallet 302. Once the material has been loaded onto the MCSS, the material may rest on the pallet 302 which may rest on the conveyor 306. The dedicated pallet 302 may be equipped with y-axis and x-axis material origin pins (y- and x-axis origin pins, origin pins) (303a and 303b respectively) to help ensure that the material 311 is always aligned on pallet 302, by for example an operator pushing the material 311 against the pins 303a as well as 303b. This way, the position of the material 311 on pallet 302, x-axis wise as well as y-axis wise, is precise and known. It should be noted that the x- and y-axis may originate from the corner 380 of the pallet 302.

The conveyor 306 may use pipe rollers (rollers) 307 to transfer the pallet 302 horizontally between different sections of the MCSS 300. As shown, at both ends of the conveyor 306, the conveyor may be equipped with x-axis location sensors (x-axis sensors, sensors) 304, which may be laser sensors, to monitor the presence and position of the pallet 302 on the conveyor 306, as described in greater detail hereinafter when referring to FIGS. 7 and 9. Shaft collars (collars) 308 may be attached to, for example, four of the rollers 307 on each conveyor 306 to provide y-axis stabilization of the pallet 302 as described in greater detail when referring to FIG. 4. The elevator 312 may lift and lower the conveyor 306 to the various operation and load positions described in greater detail hereinafter when referring to FIGS. 4, 6, and 8.

FIG. 4 illustrates the side elevation view of the material load/lift section 410 and material load frame 440, according to an aspect.

Figure 10:
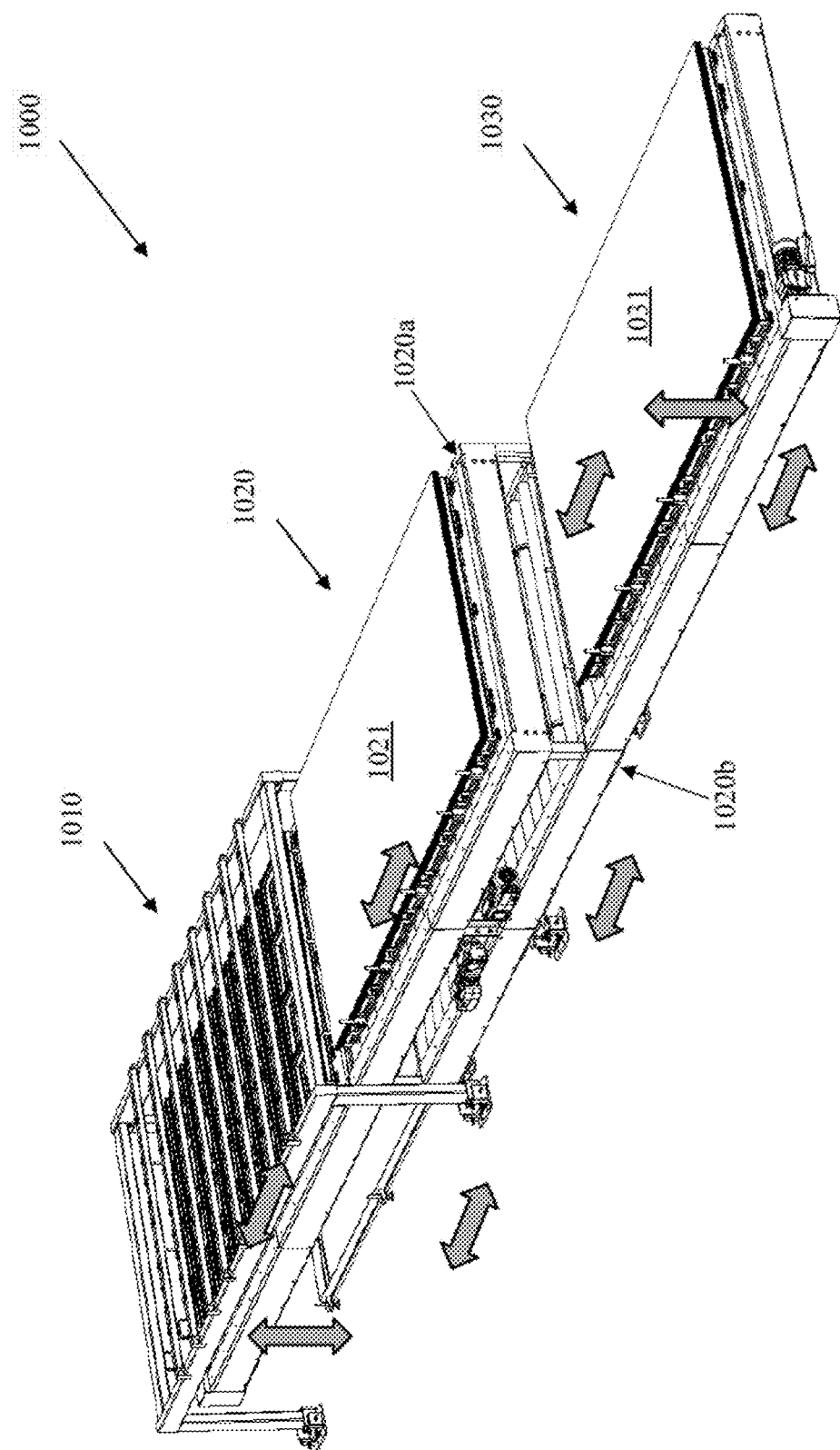
FIG. 10 illustrates a perspective view of an example of the MCSS in operation, with material loaded on two sections, according to an aspect.

The operation heights of the MCSS are the heights at which material pallets 402 can be transferred between different sections of the MCSS as described in greater detail when referring to FIGS. 2 and 10. In the example disclosed herein, with the layered storage section (220 of FIG. 2) having two storage levels, the MCSS has two operation heights. The upper operation height 414 is aligned with the upper level (220a of FIG. 2) of the layered storage section 220. The lower operation height 413 is aligned with the lower level (220b of FIG. 2) of the layered storage section 220. As an example, FIG. 2 shows the material load/lift section 210 at the upper operation height 414 and shows the CL load/lift section 230 at the lower operation height 413.

As shown in FIG. 4, the shaft collars 408 may guide the pallet 402 and keep the pallet 402 aligned during pallet exchanges with respect to the y-axis. As shown by an example in FIG. 3a, the shaft collars 308 are fitted around four of the rollers 307. As shown in FIG. 4, the inner diameter of the collars 408 may be about equal to the diameter of the rollers 407, such that the collars may rotate with the rollers. The outer diameter of the shaft collars 408 may be greater than the diameter of the rollers 407. Thus, the shaft collars 408 may extend past the rollers 407 to fit into the y-axis stabilization channels (stabilizing channels, the channels) 402b, which may be secured to the bottom of the pallet 402. As the MCSS conveyor transfers the pallet 402 between sections, the shaft collars 408 can guide the pallet's stabilizing channels 402b around the shaft collars 408 of the next section, so that the pallet 402 continues to be stabilized.

Figure 5:
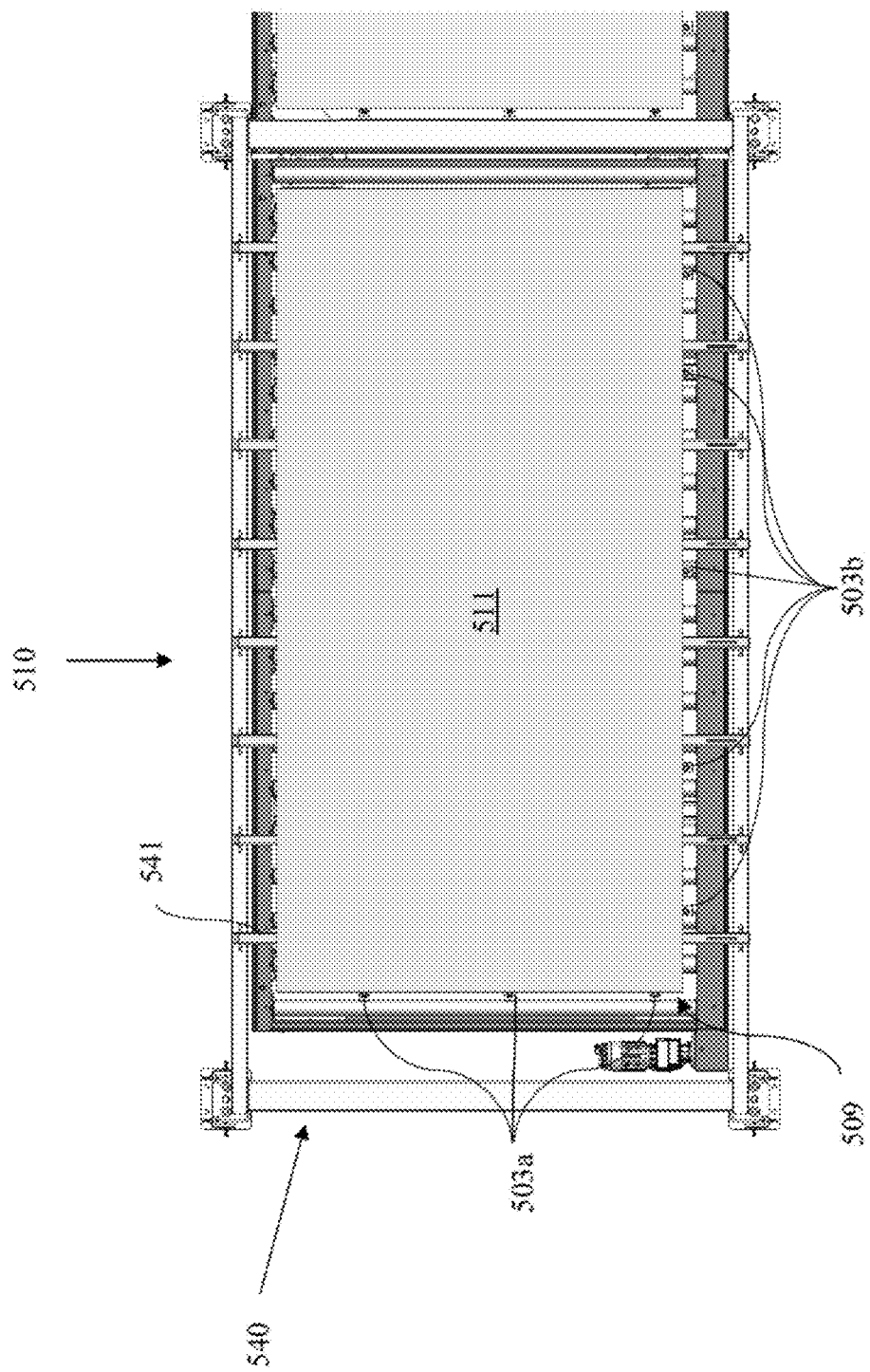
FIG. 5 illustrates the top view of the material load/lift section and material load frame during the material loading process, according to an aspect.

FIG. 5 illustrates a top view of the material load/lift 510 section and material load frame 540 during the material loading process, according to an aspect. In FIG. 5, the material 511 is shown resting atop the cross support bars 541 and the pallet may be at the "material approach" (805 of FIG. 8) or the "material alignment" (807 of FIG. 8) height. As described in greater detail when referring to FIG. 8, the material approach and alignment heights may allow the operator to adjust the position of the material 511 by moving the material on the free rollers (342 of FIG. 3b).

Figure 9:
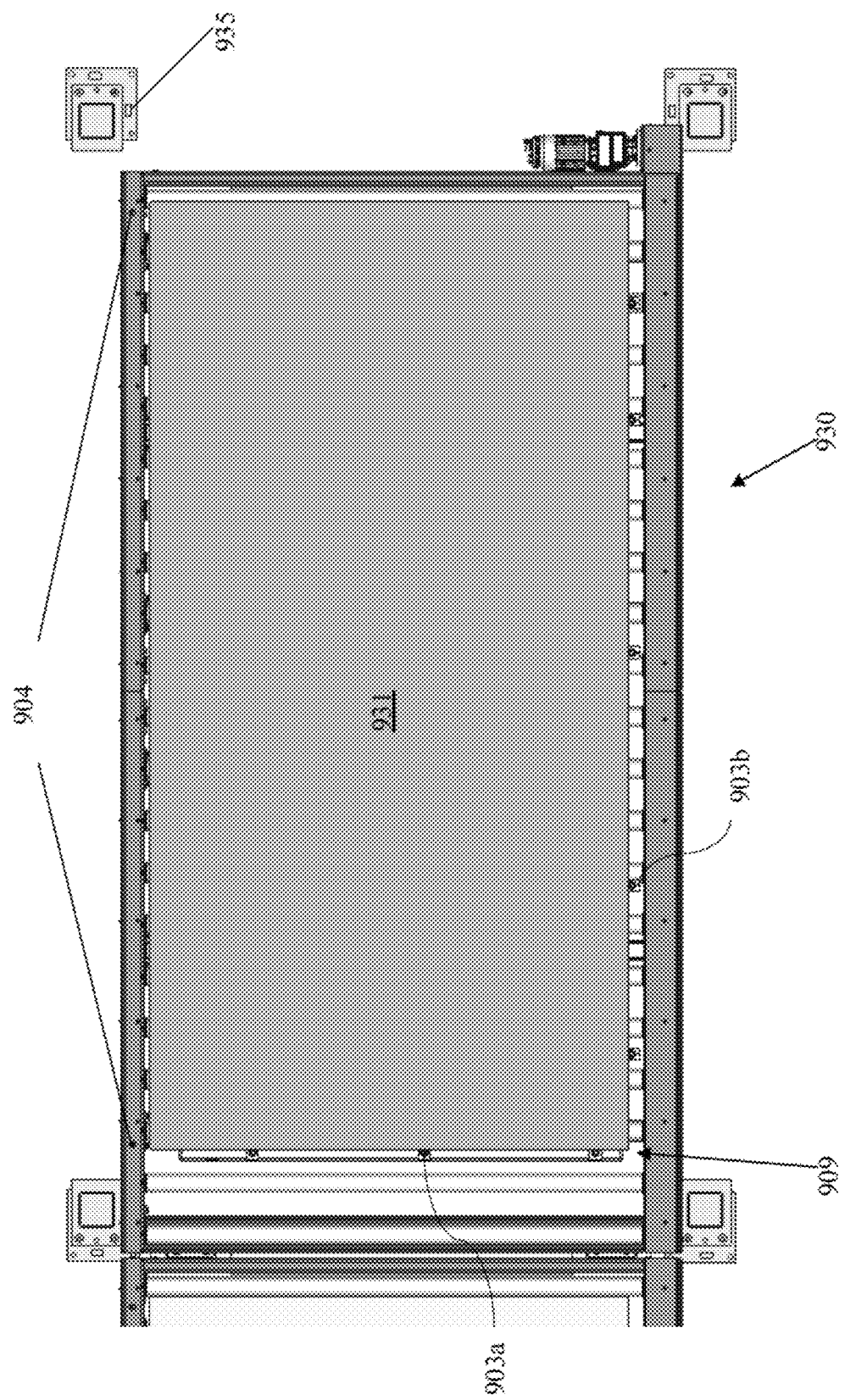
FIG. 9 illustrates the top view of the CL load/lift section, according to an aspect.

As shown in FIG. 3a, the y- and x-axis origin pins (303a and 303b respectively) may be located at one of the y- and x-edge of the pallet 302. In FIG. 5, it should be noted that the pallet is substantially not shown because it is beneath the material 511. As described when referring to FIG. 8, the operator may align the material 511 in the stack origin position (509; 609 in FIG. 6) by pushing the material against the y- and x-axis origin pins (503a and 503b, respectively; 603a and 603b in FIG. 6 until the material is in the stack origin 509 position. Material 511 may be at the origin position when the respective edges (i.e., left edge and the bottom edge in FIG. 5) of the material 511 are in contact with the origin pins 503a and 503b, as shown by FIG. 5 and FIG. 9. As an example, the origin pins 503a and 503b may be made of metal and may be removably attached to the pallet, such that the operator can remove and reposition certain origin pins (e.g., y-axis pins) to accommodate different sizes of material (e.g., shorter in length).

Figure 6:
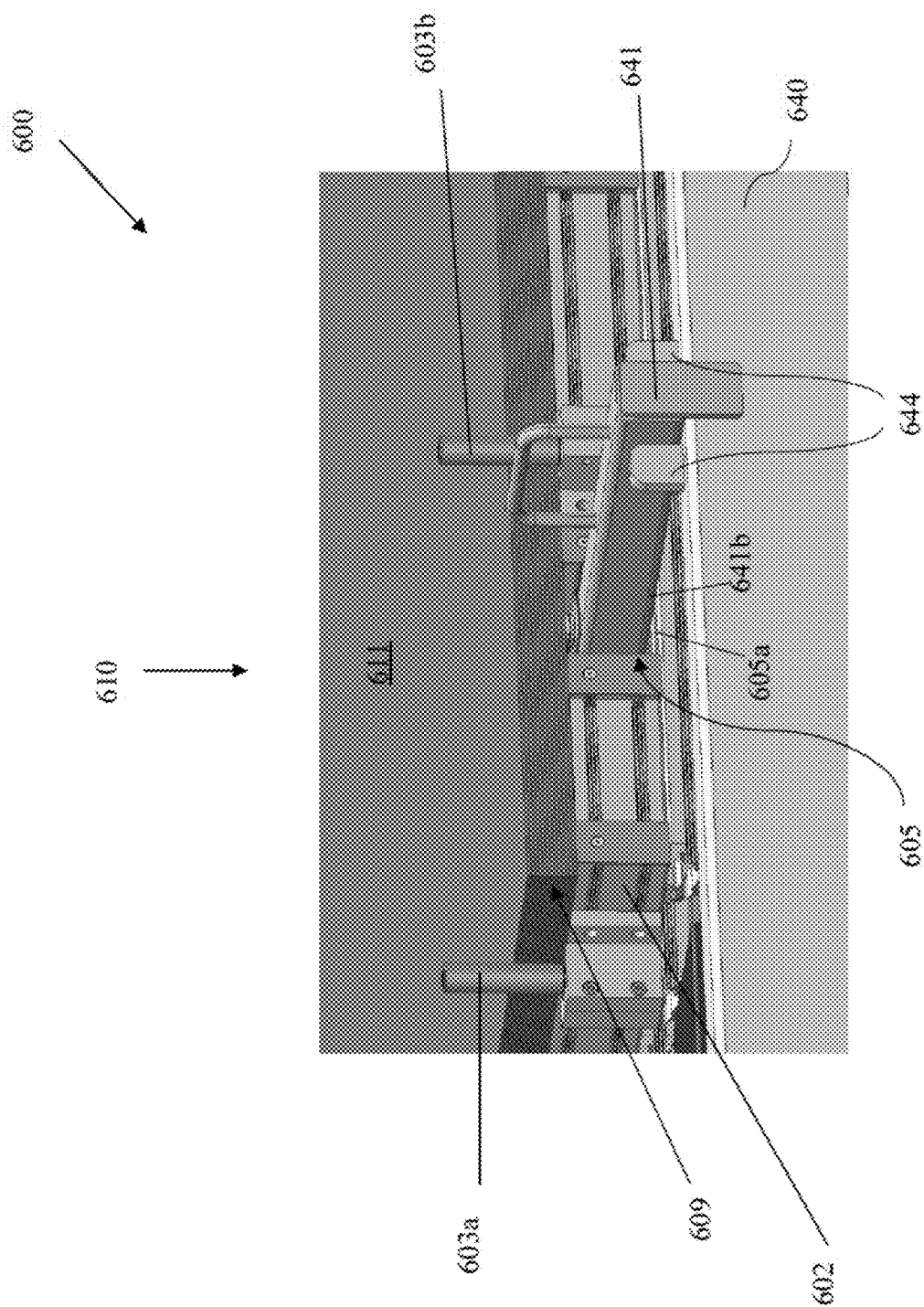
FIG. 6 illustrates a detailed partial view of the material load/lift section at the beam release height, according to an aspect.

FIG. 6 illustrates a detailed partial view of the material load/lift section 610 at the beam release height, according to an aspect. The beam release height may be used by the operator during the material loading process described when referring to FIG. 8. After the material 611 has been placed at the material origin position 609, the operator may set the elevator (212 of FIG. 2) to lift the pallet 602 to the beam release height. As shown in FIG. 6, the stabilizing brackets 644 may be attached to the material load frame (640 in FIG. 6; 340 of FIG. 3a) such that, when the pallet 602 is at the beam release height, the cross support bars 641 will fit into the pockets 605 of the pallet 602. It should be noted that, at the beam release height, the bottom 605a of the pockets 605 may touch the bottom 641a of the support bars 641 and thus, since the height of the pockets 605 may be taller than the height of the support bars 641, the support bars will preferably no longer contact the material 611 when the pallet 602 is at the beam release height. Thus, at the beam release height, the weight of the material 611 may be fully supported by the pallet 602 and not be supported by the support bars 641 resting on material load frame (340 of FIG. 3a; 640 in FIG. 6), thus allowing the support bars 641 to be pulled out. The brackets 644, which are secured to the load frame 640 may also hold the support bars 641 in place and prevent the support bars 641 from moving or slipping during steps 803 through 809 of the material loading process as described when referring to FIG. 8.

Figure 7:
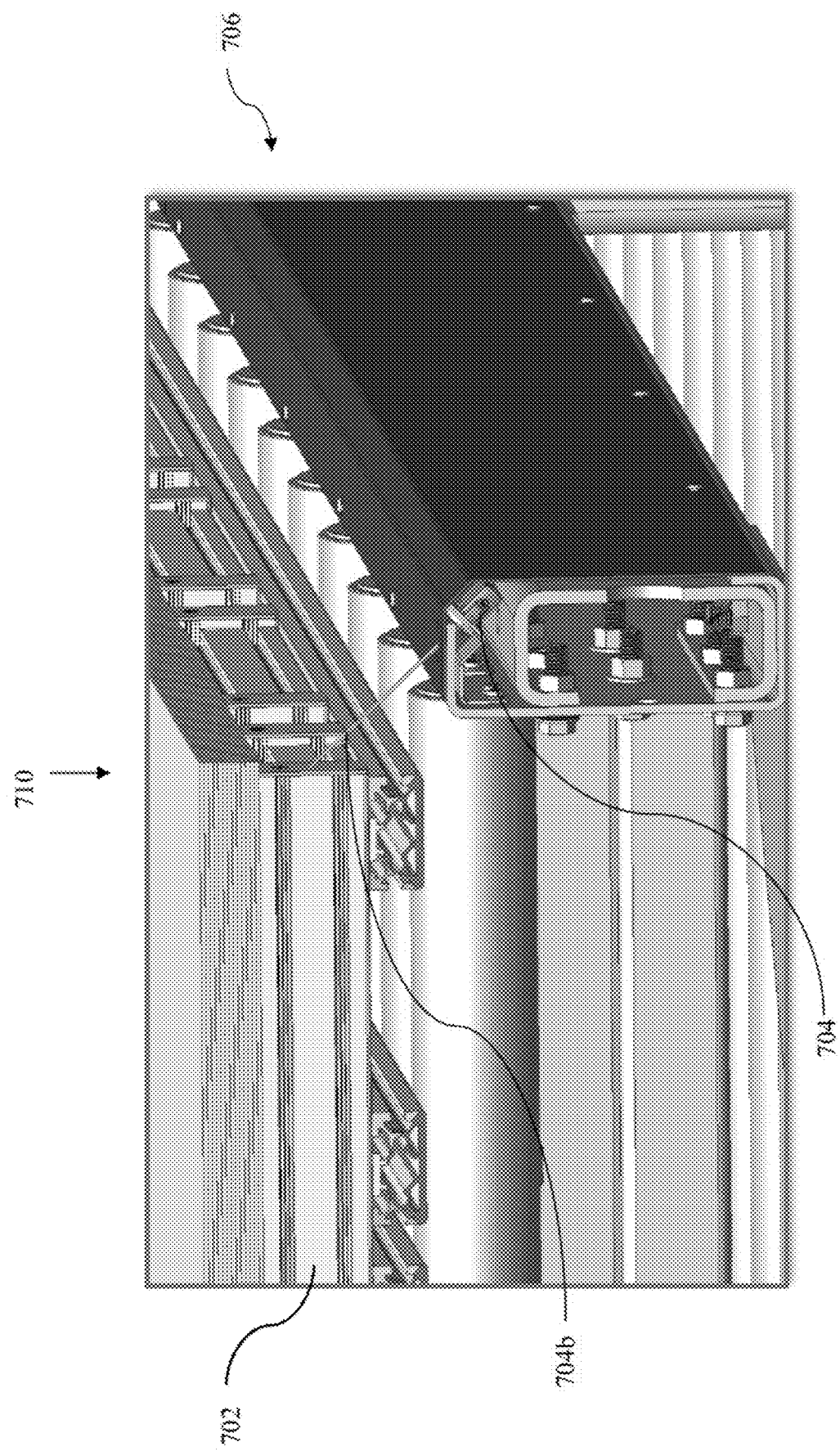
FIG. 7 illustrates a detailed partial view of the material load/lift section x-axis location sensor, according to an aspect.

FIG. 7 illustrates a detailed partial view of one of the x-axis location sensors 704 on the material load/lift section 710 conveyor 706, according to an aspect. In the example of MCSS disclosed herein, the x-axis location sensors 704 may be laser sensors. Each conveyor (i.e., conveyor for sections 210, 220a, 220b, and 230 of FIG. 2) may be equipped with two x-axis sensors at either end of the conveyor as shown by 304 in FIG. 3a and by 904 in FIG. 9. The distance between the two x-axis sensors (904 of FIG. 9) on the conveyor 906 may preferably be about equal to the length of the pallet, as depicted with FIG. 9. The x-axis sensors 704 may be placed on the conveyor 706 in this manner, so that a pallet origin position of pallet 702 may be determined, which may be when the laser beam 704b of each sensor 704 simultaneously hit the respective corner of a pallet 702, as shown in FIG. 7. As described in greater detail when referring to FIG. 9, the presence of a pallet 702 on a conveyor 706 may be detected by MCSS if the laser beam 704b of either x-axis sensor 704 contacts the edge of a pallet. The manner in which the x-axis sensors help the MCSS to determine the position of a pallet (e.g., if a pallet is completely on one section or in between sections) is described in greater detail when referring to FIG. 9.

FIG. 8 illustrates a flow chart detailing how material may be loaded onto the MCSS, according to an aspect. Before an operator begins to load material onto the MCSS using the material load frame (340 of FIG. 3a), it is suggested the operator attach and secure support lumber (311a of FIG. 3a) with steel banding (311b of FIG. 3a) to the material (311 of FIG. 3a) in the manner disclosed when referring to FIG. 3a. Again, attaching the support lumber (311a of FIG. 3a) may prevent the material 311 from bending. In the example of the MCSS disclosed herein, the material load frame 140 is placed around the material load/lift section 110 as shown in FIG. 1.

The material load sequence (802), represented by A (801), may be carried out by the following exemplary process. First, the operator sets the MCSS controls to manual (step 803), which allows the operator to manually set elevator (312 of FIG. 3a) to different operation and load heights. When the MCSS is set to manual, the elevator 312 preferably automatically lowers the pallet (302 of FIG. 3a) to the lower operation height (413 of FIG. 4). After the controls are set to manual, the operator may place the material 311 onto the cross support bars (341 of FIG. 3a) and then remove the support lumber 311a in step 804. As an example, the material may be placed on the cross support bars 341 with a forklift, as known in the art.

Next, the operator sets the elevator 312 to lift the pallet 302 to the "material approach" height (step 805). At this height, the elevator lifts the dedicated pallet to a height such that the operator can see the location of the x- and y-axis origin pins (303b and 303a, respectively) attached to the pallet 302 and adjust the position of the material (step 806) to ensure it will not collide with the x- and y-origin pins (303b and 303a of FIG. 3a, respectively). At step 806, the pallet 302 as well as the origin pins (303a, 300b) are beneath the material 311 and cannot come into contact with the material.

Once the operator is confident the origin pins (303a, 303b) will not collide with the material 311, the operator sets the elevator 312 to lift the pallet 302 to the "material alignment" height (step 807). At this height, the dedicated pallet does not support any of the material weight but is raised to a height such that the x- and y-origin pins (603b and 603a of FIG. 6, respectively) protrude past the cross support bars 641 in a manner similar to that shown in FIG. 6. Step 807 allows the operator to align the material (step 808) to the stack origin position (509 of FIG. 5) by pushing the material (511 of FIG. 5) on the free rollers (342 of FIG. 3b) until the material is against the origin pins (503a and 503b of FIG. 5) as shown by FIG. 5.

After the material is aligned at the stack origin position (509 of FIG. 5), the operator sets the elevator (312 of FIG. 3a) lift the pallet (311 of FIG. 3a) to the "beam release" height (step 809). At this height, disclosed when referring to FIG. 6, the dedicated pallet (602 of FIG. 6) is raised to fully support the weight of the material (611 of FIG. 6). Now that the weight of the material is fully supported by the pallet (302 of FIG. 3a) instead of the cross support bars (341 of FIG. 3a) resting on the material load frame, the cross support bars 341 can be removed by the operator (step 810).

The operator can remove the support bars 341 by gripping the handles (343 of FIG. 3b) and sliding the support bars 341 out of the pockets (305 of FIG. 3a) and off the load frame 340. Now that the support bars 341 have been removed from the load frame 340, the operator sets the elevator 312 to lower the pallet 302 to the "lower operation" height (step 811). Setting the pallet 302 to the lower operation height (413 of FIG. 4) lowers the raw material 311 beneath the load frame 340 and allows the operator to place the cross support bars 341 back onto the load frame (step 812), being thus ready for the next raw material load (as shown by 140 and 141 in FIG. 1). The material has now been loaded onto the MCSS and the operator can set the pallet content conditions (step 813). The pallet content conditions may include, but are not limited to, the size, quantity, and thickness of the material on the pallet. Now that the material loading process is complete, the operator sets the MCSS controls back to automatic (step 814).

It should be noted that the Machine Controller (e.g., a PLC (Programmable Logic Controller)) tracks each pallet, and therefore the contents of each pallet, during each motion routine by using the laser sensors as disclosed herein. Exemplary motion routines are disclosed when referring to FIG. 10. It should also be noted that the following step (step 815) is part of the MCSS operation process and a description of step 815 is included hereinafter in the description when referring to FIGS. 12a-b.

FIG. 9 illustrates the top view of the CL load/lift section 930, according to an aspect. The pallet is substantially not visible in FIG. 9 because the material 931, shown at the material stack origin position 909, is on top of the pallet. It should be noted that each conveyor (i.e., the conveyors on sections 210, 220a, 220b, and 230 of FIG. 2 may be equipped with two x-axis location sensors 904 placed at a width such that each sensor is positioned to detect the corner of a pallet as disclosed when referring to FIG. 7.

Each sensor 904 may be given a specific identifier (e.g., numeric identifier, descriptive identifier, etc.) by the MCSS to allow the MCSS to know the location of each sensor with respect to the rest of the MCSS system. For example, the left and right sensors on the material load/lift section (110 of FIG. 1) conveyor may be given the descriptive identifiers "left material sensor" and "right material sensor," respectively. The left and right sensors on the upper level conveyor of the layered storage section (120a of FIG. 1) may be given the identifiers "upper left sensor" and "upper right sensor," respectively. The left and right sensors on the lower level conveyor of the layered storage section (120b of FIG. 1) may be given the identifiers "lower left sensor" and "lower right sensor," respectively. The left and right sensors 904 on the CL load/lift section 930 conveyor may be given the identifiers "left CL sensor" and "right CL sensor," respectively.

Such identifiers could allow the MCSS to determine the location in the system of each pallet at any given time, based on the data reported by the x-axis sensors 904. The data reported by the sensors 904 may relate, for example, whether or not the sensor detects the presence of a pallet on a conveyor and whether the pallet is in the pallet origin position.

The presence of a pallet on a conveyor may be detected by the MCSS when the laser beams (704b of FIG. 7) of either the left or the right x-axis location sensors 904 on said conveyor contact a pallet. Once the MCSS determines the presence of a pallet on a conveyor, the position of the pallet on the conveyor may also need to be determined. In other words, the MCSS may need to determine if a pallet is entirely on the conveyor (as shown by FIG. 9), if it is in a pallet origin position, or if the pallet is partially on multiple sections of MCSS.

The position of a pallet on a conveyor and in the MCSS may be determined in a manner similar to what is described in the following examples. It should be noted that the logic used by the MCSS in the below examples may be extended to other similar scenarios not listed in the examples below.

EXAMPLE 1

There is only one pallet, referred to as "pallet A," on the MCSS. The pallet is entirely on the CL load/lift section conveyor (as shown by 931 in FIG. 9). The position of pallet A may be determined by the MCSS because both the "left CL sensor" and the "right CL sensor" 904 of the conveyor will report the presence of pallet A to the MCSS. Because there are no other pallets on the MCSS, no other x-axis location sensors will report the presence of a pallet to the MCSS. Thus, the MCSS will know pallet A is entirely on the CL load/lift section (and precisely in the pallet origin position).

EXAMPLE 2

There is one pallet (pallet A) on the MCSS. As shown in FIG. 1, sections 110 and 130 are both at the lower operation height. If pallet A is partially in section 130 and partially in section 120b, then the "lower right sensor" and the "left CL sensor" will report the presence of a pallet to the MCSS. Because there are no other pallets on the MCSS, no other x-axis location sensors will report the presence of a pallet to the MCSS. Thus, the MCSS will know pallet A is partially in section 120b and partially in section 130.

EXAMPLE 3

In this example, there are two pallets ("pallet 1021" and "pallet 1031") on the MCSS, as shown in FIG. 10. If pallet 1021 is entirely on section 1020a (of FIG. 10) and pallet 1031 is entirely on section 1030 (of FIG. 10), then the "upper left sensor," "upper right sensor," "left CL sensor," and "right CL sensor" will report the presence of a pallet to the MCSS. Because there are no other pallets on the MCSS, no other x-axis location sensors will report the presence of a pallet to the MCSS. Thus, the MCSS will know pallet 1021 is entirely on section 1020a and pallet 1031 is entirely on section 1030 (and precisely in the pallet origin position.)

EXAMPLE 4

In this example, there are two pallets ("pallet A" and "pallet B") on the MCSS. As shown in FIG. 2, section 210 is at the upper operation height and section 230 is at the lower operation height. If pallet A is partially on section 210 and partially on section 220a, then the "right material sensor" and the "upper left sensor" will report the presence of a pallet to the MCSS. If pallet B is partially on section 220b and partially on section 230, then the "lower right sensor" and the "left CL sensor" will report the presence of a pallet to the MCSS. Because there are no other pallets on the MCSS in this example, no other x-axis location sensor will report the presence of a pallet to the MCSS. Thus, the MCSS will know pallet A is partially on section 210 and partially on section 220a and will know pallet B is partially on section 220b and partially on section 230.

FIG. 10 illustrates a perspective view of an example of the MCSS in operation, with material loaded on two sections, according to an aspect. Described hereinafter are exemplary scenarios detailing how conveyors and/or elevators may work as a system to move or exchange pallets between different sections and/or operation heights of the MCSS.

It should also be understood that, as stated hereinbefore, MCSSs having more than two levels or having horizontally extended two-level storage (FIGS. 1b-c) may also be similarly used as alternative embodiments, for the storage, movement, and exchange of pallets, as disclosed herein.

It should also be noted that the pallets described in the following scenarios may or may not be loaded with raw material. If the pallets contain raw material, it should be understood that the contents of each pallet may differ. For example, one pallet may be loaded with a stack of ten 2 meter by 4 meter metal sheets with a thickness of 10.50 millimeters and another pallet may be loaded with a stack of fifteen 2 meter by 2 meter metal sheets with a thickness of 5.25 millimeters. As described when referring to FIGS.

12*a-b*, the operator may set the pallet content conditions after the material has been loaded onto the MCSS.

Scenario 1:

Pallet A is on the material load/lift section at the upper operation height, pallet B is on the upper level of the layered storage section, the lower level of the layered storage section contains no pallet, and pallet C is on the CL load/lift section at the upper operation height (110, 120*a*, 120*b* and 130 of FIG. 1, respectively). In this scenario, pallet A will be transferred from section 110 to section 130 in the following steps: (1) section 110 is moved to the lower operation height, (2) pallet A is transferred from section 110 to section 120*b* (the lower level of section 120), (3) section 110 is raised to the upper operation height, (4) pallet B is transferred from section 120*a* to section 110 and pallet C is transferred from section 130 to section 120*a* simultaneously, (5) section 110 and section 130 are lowered to the lower operation height simultaneously, (6) pallet A is transferred from section 120*b* to section 130 and pallet B is transferred from section 110 to section 120*b* simultaneously, (7) finally section 130 can be moved to the upper operation with pallet A. It should be noted that the above scenario, and similarly the scenarios below, may be used, for example, when a particular job requires, at a given time, the material resting on pallet A to be delivered to the CL Loader 1150 (see FIG. 11).

Scenario 2:

Pallet A is on section 110 at the lower operation height, pallet B is on section 120*a*, 120*b* contains no pallet, and pallet C is on section 130 at the upper operation height. In this scenario, pallet B will be transferred from section 120*a* to section 130 in the following steps: (1) section 130 is lowered to the lower operation height (2) pallet C is transferred from section 130 to section 120*b*, (3) section 130 is raised to the upper operation height, (4) finally, pallet B is transferred from section 120*a* to section 130.

Scenario 3:

Section 110 contains no pallet at the upper operation height, pallet A is on section 120*a*, pallet B is on section 120*b*, and pallet C is on section 130 at the upper operation height. In this scenario, pallet B will be transferred from section 120*b* to 130 with the following steps: (1) pallet A is transferred from section 120*a* to section 110 and pallet C is transferred from section 130 to section 120*a* simultaneously, (2) section 130 is lowered to the lower operation height, (3) finally pallet B is transferred from section 120*b* to section 130.

Scenario 4:

Section 110 contains no pallet at the upper operation height, pallet A is on section 120*a*, pallet B is on section 120*b*, and pallet C is on section 130 at the upper operation height. In this scenario, pallet A is transferred from section 120*a* to 130 in the following steps: (1) section 110 and section 130 are lowered to the lower operation height simultaneously, (2) pallet B is transferred from section 120*b* to section 110 and pallet C transferred from section 130 to section 120*b* simultaneously, (3) section 130 is raised to the upper operation height, (4) finally pallet A is transferred from section 120*a* to section 130.

Figure 11:
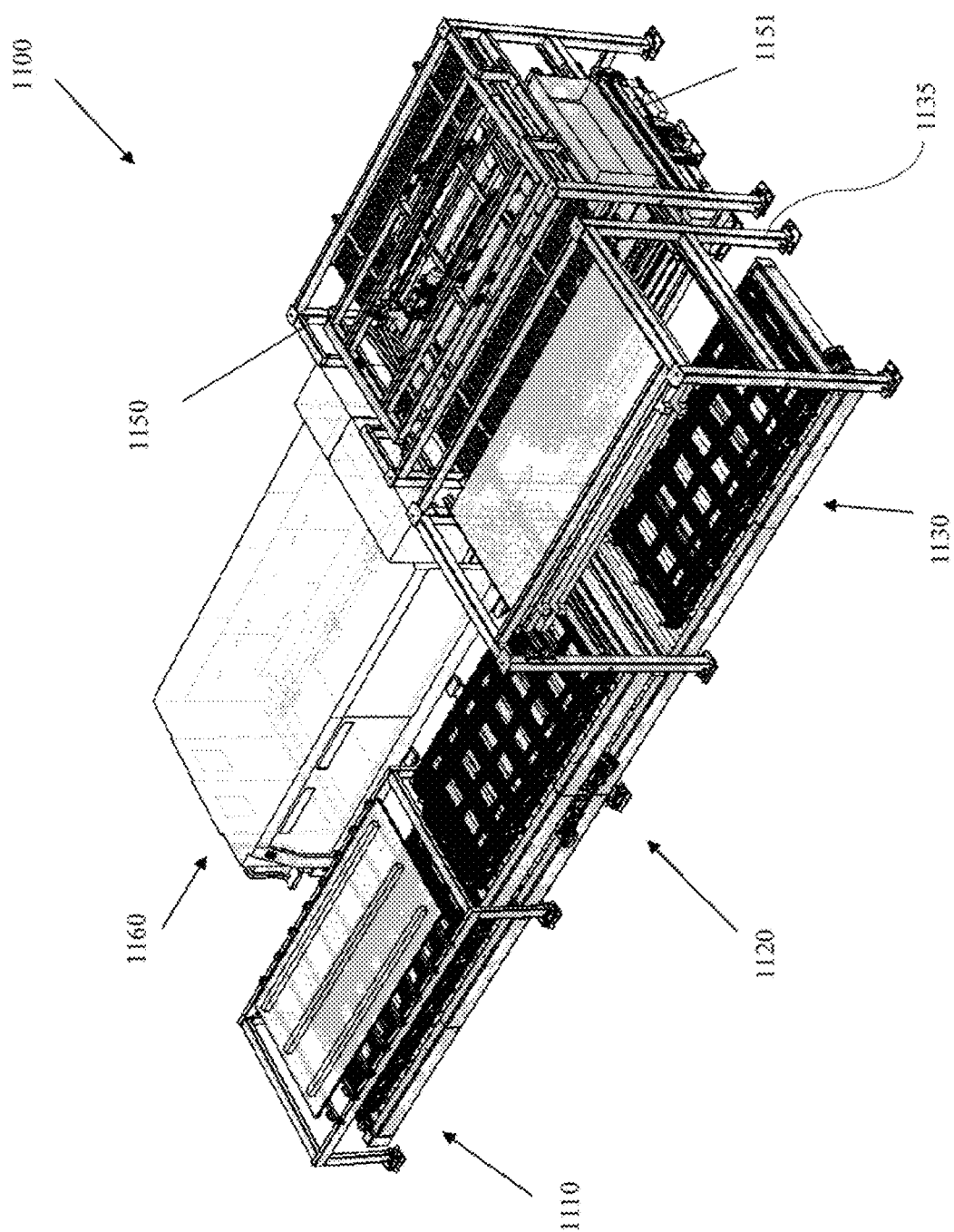
FIG. 11 illustrates the perspective view of the MCSS in operation with a laser machine, according to an aspect.

FIG. 11 illustrates the perspective view of the MCSS in operation with a laser machine according to an aspect. In FIG. 11, the MCSS is shown to be installed next to a laser machine loader cycle loader (CL, CL machine, laser machine loader) 1150 and a laser machine (machine, laser) 1160. Together, the CL and the laser machine make up the Amada Module System-Cycle Loader (AMS-CL). The laser machine's loader 1150 may grab material from the CL load/lift section 1130 via a suction frame 1135 using suction cups (not shown), place the material onto the shuttle table 1151, and the shuttle table may then feed the material into the laser machine 1160. As described herein, the pallet having the material that is needed at a particular time can be transferred automatically from any section of the MCSS to section 1130 and then section 1130 can be raised to a height such that the laser machine loader 1150 can grab and feed the material into 1160. It should be noted that the tracking capability, disclosed herein, enables the MCSS to automatically transfer the required size material resting on a specific pallet to section 1130, and therefore to the CL Loader 1150.

Again, it should be understood that, while the MCSS is primarily designed, as described herein, to feed raw materials to a Cycle Loader 1150, which in turn may feed said raw materials to a laser machine 1160, the system may be extended or modified to also receive and store cut materials unloaded from the laser machine 1160 via the Cycle Loader 1150 or via another way.

Figure 12A:
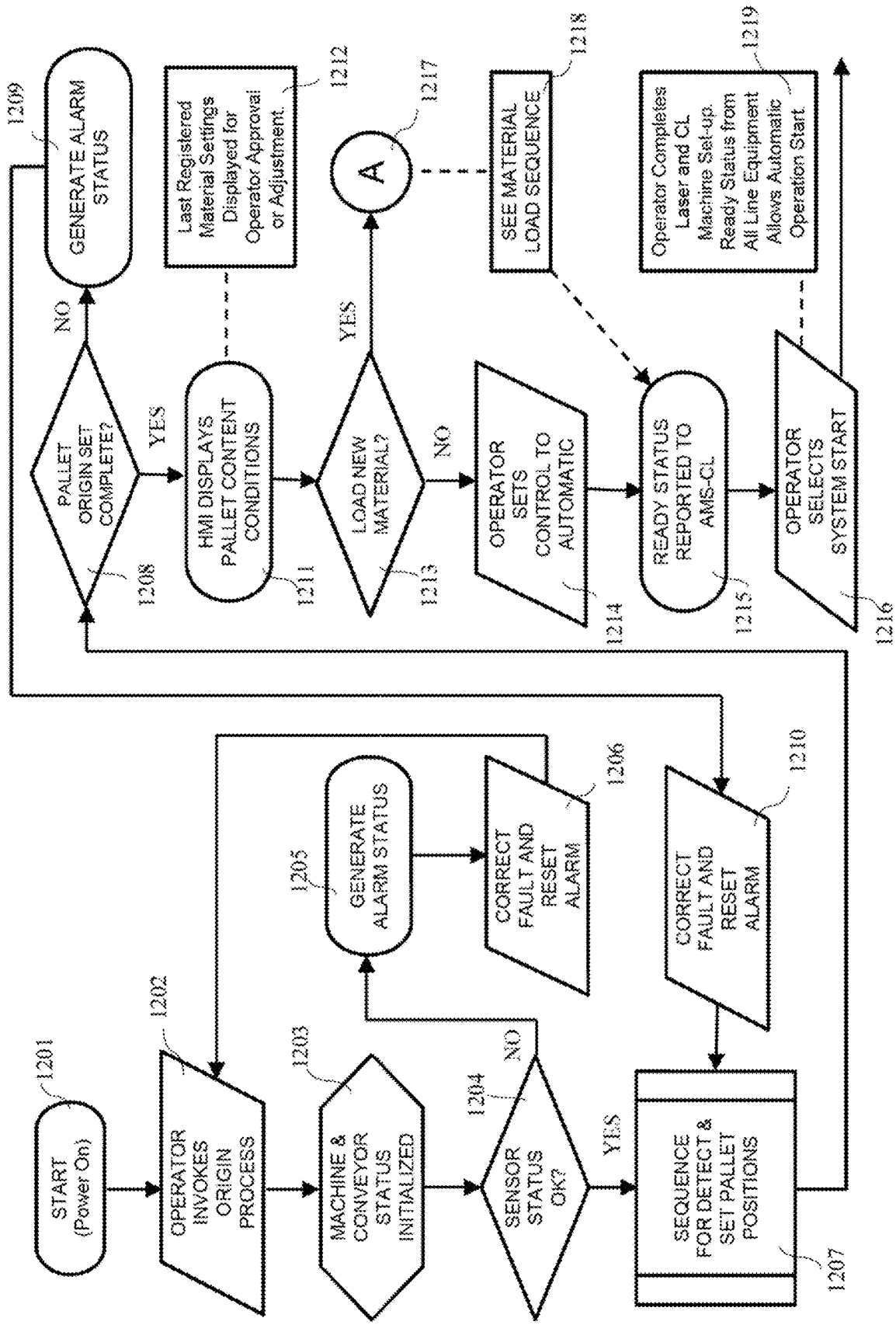
FIGS. 12a-b illustrate a flow chart detailing how a user may operate the MCSS.
Figure 12B:
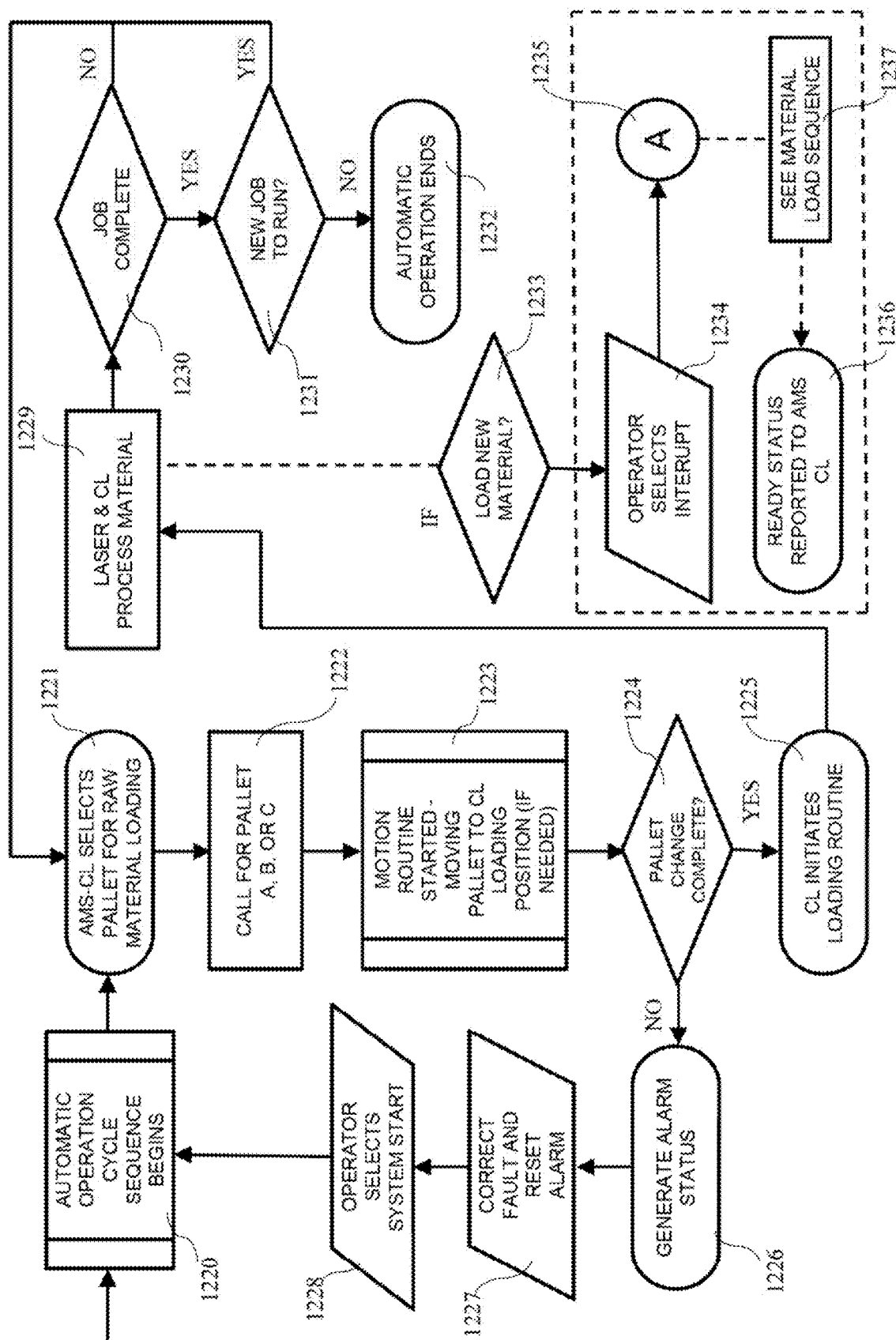

FIG. 12*a-b* illustrates a flow chart detailing how a user may operate the MCSS. This exemplary process starts by first powering on the MCSS (step 1201). Next, the operator invokes the origin process (step 1202), which may be done by pressing a button. The origin process is described by steps 1202 though 1208 of FIG. 12*a*. Once the origin process has been invoked, the machine (1160 of FIG. 11) and MCSS (1100 of FIG. 11) prepare themselves for operation, or in other words, the statuses are initialized (step 1204). Once the status is initialized, the status of each laser sensor is checked (step 1204). If the sensors are not ok (or not operational), then an alarm is generated (step 1205) to notify the operator to correct the fault in the sensor and reset the alarm (step 1206). Once the operator corrected the fault and the alarm was reset, the origin process is again invoked (step 1202).

If the sensors are ok, a sequence for detecting and setting the pallet positions begins (step 1207). During this step, the presence and the position, including pallet origin position of each pallet on each conveyor are evaluated by the sensors using the methods described hereinbefore when referring to FIGS. 7 and 9. If the position of any of the pallets needs to be adjusted in order to place the pallet in the pallet origin position, the conveyor will attempt to automatically correct the position of the pallet by for example moving the pallet horizontally forward or backward when the pallet extends over two sections. Next, if the pallet origin set (step 1208) is not complete (i.e., the conveyor was unable to correct the position of the pallet), an alarm is generated (step 1209) to notify the operator to correct the fault and reset the alarm (step 1210).

Once the alarm is reset, the sequence for detecting and setting the pallet positions (step 1207) is again initiated. If the pallet origin set (step 1208) is completed correctly, then the origin process has been completed and a human machine interface (HMI) can display a screen for the pallet content conditions (step 1211). The pallet content condition refers to material setting such as the dimensions, weight, quantity, etc. of the material.

The HMI may display the last registered material settings for the operator to approve or adjust (step 1212). Once the operator has approved or adjusted the material settings as needed, the operator will be presented with the option to load new material (step 1213). If the operator does not need to load new material, then the operator may set the MCSS controls to automatic (step 1214) and the status that the MCSS 1100 is "ready" is reported to the AMS-CL (step 1215). If the operator does need to load new material, they may do so by using the material load sequence (step 1218), represented by A (step 1217), the details of which are described hereinbefore when referring to FIG. 8. Once the new material has been loaded onto the MCSS, the status that the MCSS is "ready" is reported to the AMS-CL (step 1215). After the MCSS is ready for operation, the operator sets up the laser machine 1160 and the CL machine 1150 (step 1219). Operation of all lines (the MCSS, CL, and laser machine) will not begin until all line equipment reports a status of "ready."

The operator can now select "system start" (step 1216), which triggers the automatic operation cycle sequence to begin (sequence) (step 1220). This sequence consists of steps 1220 through 1232. For the first step in the automatic sequence, the AMS-CL selects which pallet contains the raw material it needs to load (step 1221). As described hereinbefore when referring to FIG. 8, the AMS-CL may know the location of the pallet containing the desired raw material with respect to the rest of the system because the Machine Controller (PLC) tracks the pallet movements after the operator loads raw material, and therefore tracks the material on said pallet. Next, the AMS-CL calls for said pallet (step 1222) and the motion routine for moving the selected pallet to the CL load/lift section is started (step 1223). This motion routine may be one of the scenarios contained in the description for FIG. 10. Then, the MCSS 1100 utilizes the x-axis sensors to determine whether or not the pallet change has been completed (step 1224). If the pallet change is not complete, and alarm will be generated (step 1226) to notify the operator to correct the fault and reset the alarm (step 1227). Then, the operator can once again select system start (step 1228, 1216) to once again begin the automatic sequence (step 1220). If the pallet change is completed correctly (i.e., desired pallet is in the origin position and in the CL lift/load section 1130, then the CL (1150 of FIG. 11) initiates the loading routine (step 1225) and the laser machine and CL process the material (step 1229).

If the job is not complete (i.e., the laser machine needs more raw material to complete the job, then the AMS-CL will select another pallet for raw material loading (step 1221). If the job is complete, then the operator has the option to run a new job (step 1231). If the operator chooses to run a new job, then the AMS-CL will select another pallet for raw material loading (step 1221). If the operator does not choose to run a new job, then the automatic operation sequence ends (step 1232).

If at any point the operator needs to load additional material (step 1233), such as during the laser machine and CL material processing, the operator must select "interrupt" (step 1234) to halt the MCSS, CL, and laser machine processes. Once the processes have been halted, the operator can proceed to load new raw material using and referring to the material load sequence (step 1237) represented by "A" (step 1235). As before in step 1215, the status that the MCSS 1100 is "ready" is reported to the AMS-CL (step 1236) after the operator completes the material loading process. It should be noted that it is possible to load new material at any time, with some limitations. For example, if the laser machine and CL is running (i.e., laser machine is cutting sheets and CL is loading the next sheet based on the scheduler) and there isn't any empty position on the conveyor to be able to move either backwards or forwards, it would be needed to interrupt the CL loader in order to be able to load new position on the conveyor. As another example, if the cutting cycle per sheet metal is long (let's say one hour), it may be enough time to load new pallet with raw material on conveyor, without interrupting the scheduler of automation.

It should be noted that all the processes, routines, sequences and algorithms described herein can be incorporated in a logic (software, hardware or combination thereof) that can be used to control the MCSS system disclosed herein.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A modular system for material storage and conveying comprising:
a layered storage section having a plurality of storage layers, a first end and a second end opposite the first end, the plurality of storage layers comprising a first storage layer having a first conveyor disposed at a lower operation height and a second storage layer having a second conveyor and being disposed above the first storage layer at an upper operation height, wherein both the first conveyor and the second conveyor are adapted to convey bidirectionally, between the first end and the second end;
a load section extending from the first end of the layered storage section and comprising a first elevator and a third conveyor, the first elevator being adapted to lift the third conveyor to the upper operation height and lower the third conveyor to the lower operation height, wherein the third conveyor is adapted to convey bidirectionally towards and opposite the first end of the layered storage section;
a delivery section extending from the second end of the layered storage section and comprising a second elevator and a fourth conveyor, the second elevator being adapted to lift the fourth conveyor to the upper operation height and lower the fourth conveyor to the lower operation height, wherein the fourth conveyor is adapted to convey bidirectionally towards and opposite the second end of the layered storage section; and
wherein the modular system is adapted such that the bidirectional and lifting movements are coordinated to allow selective repositioning of a load from any of the four conveyors to any other of the four conveyors.

2. The modular system for material storage and conveying of claim 1, wherein each of the four conveyors comprises two x-axis laser location sensors adapted to determine the presence and position of a dedicated pallet on the conveyor, including an origin position of the dedicated pallet which is when a laser beam of each sensor simultaneously hit x-axis opposing corners of the dedicated pallet.

3. The modular system for material storage and conveying of claim 2, wherein the x-axis laser location sensors have a sensor identifier, such that to allow for determining a location of the dedicated pallet within the modular system at any given time.

4. The modular system for material storage and conveying of claim 2, wherein the dedicated pallet comprises a stabilization channel disposed at the bottom of the dedicated pallet and wherein each of the four conveyors comprises rollers having collars adapted to fit into the stabilization channel and thus provide y-axis stabilization of the dedicated pallet.

5. The modular system for material storage and conveying of claim 1, wherein the plurality of storage layers further comprises a third storage layer disposed above the second storage layer.

6. The modular system for material storage and conveying of claim 5, wherein the third storage layer has a conveyor.

7. The modular system for material storage and conveying of claim 1, wherein the plurality of storage layers further comprises a third storage layer extending horizontally from the first storage layer and a fourth storage layer extending horizontally from the second storage layer.

8. The modular system for material storage and conveying of claim 7, wherein the third storage layer and the fourth storage layer each have a conveyor.

9. The modular system for material storage and conveying of claim 1, wherein, when a first material pallet is on the third conveyor at the upper operation height, a second material pallet is on the second conveyor of the layered storage section, the first conveyor contains no pallet, and a third material pallet is on the fourth conveyor at the upper operation height, the modular system is adapted to transfer the first material pallet from the load section to the delivery section by lowering the third conveyor to the lower operation height, transferring the first material pallet from the third conveyor to the first conveyor, lifting the third conveyor to the upper operation height, transferring simultaneously the second material pallet from the second conveyor to the third conveyor and the third material pallet from the fourth conveyor to the second conveyor, lowering simultaneously the third conveyor and the fourth conveyor to the lower operation height, and transferring simultaneously the first material pallet from the first conveyor to the fourth conveyor and the second material pallet from the third conveyor to the first conveyor.

* * * * *